US007155222B1

(12) United States Patent
Jain et al.

(10) Patent No.: US 7,155,222 B1
(45) Date of Patent: Dec. 26, 2006

(54) METHOD FOR PERFORMING RR-LEVEL REGISTRATION IN A WIRELESS COMMUNICATION SYSTEM

(75) Inventors: Avinash Jain, San Diego, CA (US); Edward G. Tiedemann, Jr., Concord, MA (US)

(73) Assignee: Qualcomm, Inc., San Diego, CA (US)

( * ) Notice: Subject to any disclaimer, the term of this patent is extended or adjusted under 35 U.S.C. 154(b) by 485 days.

(21) Appl. No.: 09/704,994

(22) Filed: Nov. 2, 2000

Related U.S. Application Data

(60) Provisional application No. 60/175,366, filed on Jan. 10, 2000.

(51) Int. Cl.
*H04Q 7/20* (2006.01)

(52) U.S. Cl. .............................. 455/435.1; 455/422.1; 455/432.1; 455/435.2; 380/247

(58) Field of Classification Search ............. 455/422.1, 455/426.1, 432.1, 419, 435.1, 440, 436, 411, 455/458, 435.2, 435.3, 433–434; 370/328, 370/503; 380/247–248, 258, 270
See application file for complete search history.

(56) References Cited

U.S. PATENT DOCUMENTS

| | | | | |
|---|---|---|---|---|
| 4,876,738 A * | 10/1989 | Selby | ....................... | 455/435.1 |
| 5,642,398 A * | 6/1997 | Tiedemann et al. | ....... | 455/426.1 |
| 5,675,628 A | 10/1997 | Hokkanen | ................... | 455/433 |
| 5,842,127 A * | 11/1998 | Pashtan et al. | ........... | 455/435.3 |
| 5,898,923 A * | 4/1999 | Gaasvik et al. | ............. | 455/434 |
| 5,920,814 A * | 7/1999 | Sawyer et al. | ............ | 455/422.1 |
| 6,064,889 A * | 5/2000 | Fehnel | ........................ | 455/511 |
| 6,119,000 A * | 9/2000 | Stephenson et al. | ...... | 455/432.1 |
| 6,208,628 B1 * | 3/2001 | Monrad et al. | ............. | 370/328 |
| 6,381,456 B1 * | 4/2002 | Ko | .......................... | 455/435.1 |
| 6,381,457 B1 * | 4/2002 | Carlsson et al. | .......... | 455/435.2 |
| 6,387,027 B1 * | 5/2002 | Bodin | ........................ | 455/419 |
| 6,553,227 B1 * | 4/2003 | Ho et al. | ..................... | 455/433 |

(Continued)

FOREIGN PATENT DOCUMENTS

| | | | |
|---|---|---|---|
| EP | 0260763 A2 * | 9/1987 | |
| EP | 0260763 | 3/1988 | |
| EP | 0344989 | 6/1989 | |

OTHER PUBLICATIONS

M. Mouly et al: "The GSM System for Mobile Communications" FR, Lassay-Les Chateaux, Europe Media, 1993, pp. 489-492. * cited by examiner

*Primary Examiner*—Joseph Feild
*Assistant Examiner*—Kamran Afshar
(74) *Attorney, Agent, or Firm*—Philip R. Wadsworth; Thien T. Nguyen; George J Dehling

(57) ABSTRACT

Techniques to reduce the amount of registration required by a mobile station in a wireless communication system, especially if the registration zones are defined to be small areas. In one scheme, a mobile station registers (e.g., at RR-level) with a network entity (e.g., a base station) each time it enters a new registration zone, which can correspond to an R-TMSI zone defined by GSM MC-MAP. The mobile station maintains a timer for each zone with which it has already registered but has since left. If the mobile station leaves a particular zone for a period longer than a time-out period, the registration with that zone times out, and the mobile station re-registers with that zone whenever it re-enters the zone. The mobile station may implement zone-based, timer-based, implicit, traffic channel RR, and some other registrations, or a combination thereof. Parameters to facilitate registration may be defined by a base station.

24 Claims, 5 Drawing Sheets

U.S. PATENT DOCUMENTS

| | | |
|---|---|---|
| 6,668,166 B1 * | 12/2003 | Kanabar .................... 455/411 |
| 6,731,932 B1 * | 5/2004 | Rune et al. .............. 455/432.1 |
| 6,763,240 B1 * | 7/2004 | Chambers et al. ....... 455/435.1 |
| 6,792,277 B1 * | 9/2004 | Rajaniemi et al. ....... 455/432.1 |
| 6,954,642 B1 * | 10/2005 | Chambers et al. ....... 455/435.1 |
| 6,968,196 B1 * | 11/2005 | Back et al. .............. 455/456.5 |
| 6,983,159 B1 * | 1/2006 | Di Pasquale et al. .... 455/435.1 |
| 2002/0164026 A1 * | 11/2002 | Huima ....................... 380/247 |
| 2005/0037755 A1 * | 2/2005 | Hind et al. .............. 455/435.3 |
| 2005/0070283 A1 * | 3/2005 | Hashimoto et al. ...... 455/435.1 |

\* cited by examiner

METHOD FOR PERFORMING RR-LEVEL REGISTRATION IN A WIRELESS COMMUNICATION SYSTEM

CROSS REFERENCE TO RELATED APPLICATIONS

This application claims the benefit of provisional U.S. Application Ser. No. 60/175,366, entitled "RR-LEVEL REGISTRATION," filed Jan. 10, 2000, which is incorporated herein by reference in its entirety for all purposes.

BACKGROUND OF THE INVENTION

I. Field of the Invention

The present invention relates to data communication. More particularly, the present invention relates to a novel and improved method to perform registration in a wireless communication system, and which is well suited for systems having smaller registration zones.

II. Description of the Related Art

In a wireless communication system, registration is a process used by a mobile station to inform the system whether it is on the air and from which base station it is currently receiving a signal. The mobile station may be a cellular telephone, a personal communication device, or some other unit, and may be a vehicle mounted unit or a handheld portable unit. The system thereafter uses the registration information to determine whether to page the mobile station to locate it for any type of transaction with the system and, if so, from which set of base stations to broadcast the page. The registration information can thus be used to reduce the amount of paging by the base stations.

As an example, for a call directed to a particular mobile station, which is often referred to as a "mobile terminated" call, the system can determine whether the mobile station is powered on and, if yes, from which base station it is receiving a signal. To locate the mobile station, the system can broadcast a message, which is often referred to as a page, from a number of base stations directed to the mobile station. If the mobile station responds, the system continues to process the call with subsequent communication being handled by the base station responsible for the coverage area in which the mobile station is located.

If the system has no knowledge of the location of the mobile station, then the system can broadcast pages in every sector of every base station. The base station and its coverage area are commonly referred to as a "cell". The cell may further be divided into (e.g., three) sectors, with each sector being served by a respective beam from the base station. As the amount of mobile terminated traffic increases, the communication resources to support system wide paging becomes enormous in a large system.

As noted above, to reduce the amount of paging by the base stations, a mobile station can use the registration process to inform the system where it is located. Various registration methods have been used including zone-based, timer-based, and distance-based registration methods. Each of these registration methods is typically effective for a particular set of circumstances.

While registration helps in reducing the amount of overhead in paging the mobile stations in coverage areas where they may not be located, there is an additional overhead associated with the registration process itself. This leads to a compromise in selecting the size of the registration zones and the frequency of the registration process. When the service traffic is continuous in between long periods of inactivity (e.g., voice), the registration zones may be advantageously defined to be large (since registration is performed during periods of inactivity). However for bursty traffic (such as packet data), there may be very small periods of inactivity. To reduce the overhead in frequent intermittent paging to large coverage areas, while the packet call is still in progress, very small registration zones can be defined. This may be performed in addition to registration with the network within large coverage areas.

For certain wireless systems, such as a system that conforms to GSM MC-MAP standard (defined below), the registration zone may be defined to be a (relatively) small area and a large percentage (e.g., 50%) of the mobile stations in the system may be located in the boundary areas of the cells. For these systems, a small amount of movement by a mobile station or just variations in the communication links may cause the mobile station to move (or appear to move) from one registration zone to another. This can cause a "ping-pong" effect in which the mobile station may be required (by the system design) to continually register with base stations in adjacent zones. This continual registration can, in turn, burden the system and result in inefficient use of the available link resources.

Accordingly, techniques that can be used to improve the registration process and reduce the amount of unnecessary registration, especially for systems having smaller registration zones, are highly desirable.

SUMMARY OF THE INVENTION

The presently disclosed method and apparatus provide various registration techniques to reduce the amount of registration required by a mobile station in a wireless communication system. A specific registration scheme includes zone-based registration, timer-based registration, implicit registration, and others. The registration scheme is especially advantageous for systems (e.g., GSM MC-MAP system) in which the registration zone is defined to be a (relatively) small area. Since this type of registration over small zones (e.g., with a radio resource entity in the base station) is in addition to the registration with a higher layer network entity (monitoring a large coverage area), the registration process is simple with triggers defined appropriately to reduce or eliminate the "ping pong" effect.

In accordance with an aspect of the invention, a mobile station registers (e.g., at RR-level) with a network entity (e.g., a base station) each time it enters a new registration zone. The registration zone can correspond to a Radio Temporary Mobile Station Identity (R-TMSI) zone defined by GSM MC-MAP, which approximates the coverage area of the base station. The mobile station maintains a timer for each R-TMSI zone with which it has already registered but has since left. If the mobile station leaves a particular R-TMSI zone for a period longer than a time-out period, the registration with that R-TMSI zone times out, and the mobile station then re-registers with that zone if and when it re-enters the zone.

The mobile station can be designed and operated to perform zone-based registration, timer-based registration, implicit registration, traffic channel RR registration, some other registration, or a combination thereof. Parameters can be defined to facilitate registration, and some of these parameters may be defined by a base station. Such base station defined parameter values may include, for example, whether RR-level registration is enabled, whether timer-based registration is enabled, the time period for which timer-based registration should be initiated, the time-out period for a particular R-TMSI zone, and so on. The zones with which the mobile station has registered can be maintained in a zone list. The zone list can include an entry for each active zone, with each entry including various registration information used for the registration with the associated zone.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

In a wireless communication system, a registration scheme is typically employed to track the location and status of the mobile stations in the system. Without this knowledge, directing information toward a particular mobile station would require a page intended solely for the particular mobile station to be broadcast over all areas in some universal format to ensure that the mobile station is contacted. Using registration, the mobile station can inform a system entity (e.g., a mobile switching center (MSC) or a base station) of its location and status. The receiving entity records this information in a database for subsequent communication with the mobile station. For example, if the system has a message for the mobile station, the database can be accessed to determine which base station(s) and format can be used to send the message to the recipient mobile station.

The registration techniques described herein can be advantageously used in various wireless communication systems such as, for example, a Code Division Multiple Access (CDMA) system, a Time Division Multiple Access (TDMA) system, and a Frequency Division Multiple Access (FDMA) system. Such CDMA system may conform to a particular standard such as, for example, the "TIA/EIA/IS-95 Mobile Station-base Station Compatibility Standard for Dual-Mode Wideband Spread Spectrum Cellular System" (the IS-95 standard), the standard offered by a consortium named "3$^{rd}$ Generation Partnership Project" (3GPP) and embodied in a set of documents including Document Nos. 3G TS 25.211, 25.212, 25.213, 25.214, 25.133, 25.305, 25.331 and 3G TR 25.926 (the W-CDMA standard), the "TR-45.5 Physical Layer Standard for cdma2000 Spread Spectrum Systems" (the cdma2000 standard), and the standard offered by another consortium named "3$^{rd}$ Generation Partnership Project" (3GPP2) called "GSM MC-MAP (Multi Carrier (cdma2000) on GSM-MAP core network)." New CDMA standards are continually proposed and adopted for use. These CDMA standards are incorporated herein by reference. The TDMA system may be a GSM (Global System for Mobile Communications) system and may conform to a particular standard such as, for example, GSM-MAP (Mobile Application Part).

A registration scheme can be designed especially for the particular wireless communication system on which the scheme is employed. To provide improved services, different types of wireless communication systems may be integrated via standardized signaling interfaces. For clarity, various aspects of the registration scheme of the invention are described below for a cdma2000 system that also supports the GSM MC-MAP standard.

Figure 1:
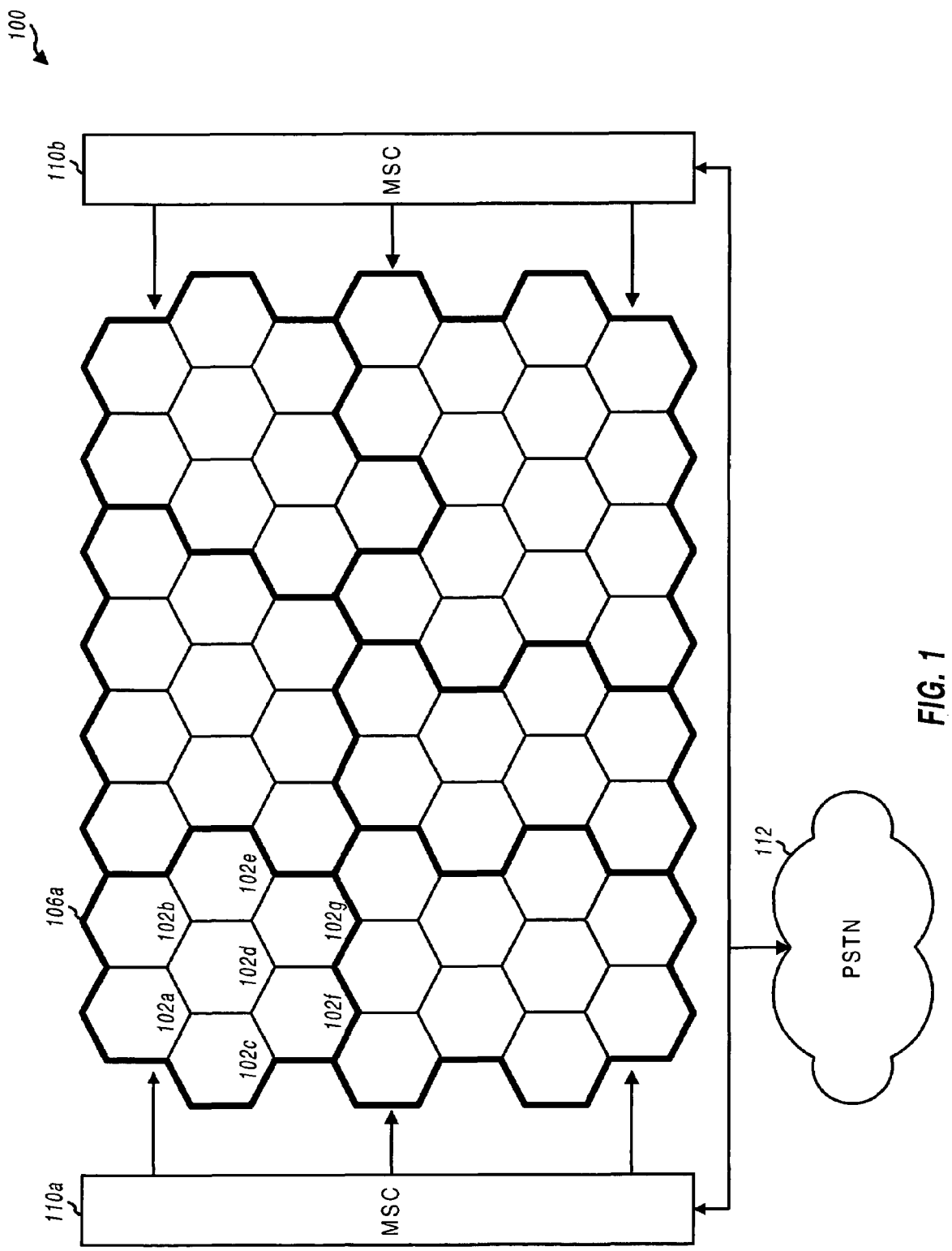
FIG. 1 is a diagram of a radio network comprising a number of cells.

FIG. 1 is a diagram of a radio network 100 comprising a number of cells 102. Each cell 102 corresponds to a particular geographic area and is served by an associated base station (not shown in FIG. 1 for simplicity). A mobile switching center (MSC) 110 couples to and serves a number of base stations. MSCs 110 in radio network 100 couple to each other and to a public switch telephone network (PSTN) 112 that supports communication with conventional telephone systems. The cells associated with each MSC 110 are typically divided into one or more regions 106, grouped together by an entity called a Base Station Controller (BSC) in cdma2000 and GSM and a radio network controller (RNC) in W-CDMA. For the examples shown in FIG. 1, region 106a includes cells 102a through 102g. For packet calls in cdma2000, each of the BSCs (e.g., a BSC for region 106a) has an entity for Packet Conversion Function (PCF) and the coverage area of the BSC is the PCF coverage area. For packet calls in GSM and W-CDMA, there may be many BSCs or RNCs in the coverage area of a new network entity Serving GPRS Support Node (SGSN), which is a subset of the coverage area of the associated MSC.

For a conventional cellular system, a mobile station initiates registration with the system when it moves into a coverage area with which it has not registered. The mobile station can determine that it has changed coverage area because the base station of each cell periodically transmits the identity of the entity of the network with which the mobile station registers.

Via the messages exchanged during registration, the mobile station can inform the relevant network entity of various parameters such as its mobile station identity and mobile station capabilities. The registration information is received at the base station and may be relayed to the MSC associated with the base station. In GSM, W-CDMA, and GSM MC-MAP systems, for packet calls, another registration message is relayed to SGSN in packet switched network. At the MSC, the registration information is typically stored in a database that may include, for example, a home location register (HLR) and a visitor location register (VLR). The HLR stores information for mobile stations assigned to the administrator of the MSC, and the VLR stores information for mobile stations that are roaming from their home MSC.

As noted above, a mobile station can be designed to implement a number of communication standards and possibly also support different technologies (e.g., CDMA and TDMA). For example, the mobile station can be designed to support the cdma2000 standard for a CDMA system and the GSM standard for a TDMA system. A registration process can then be developed such that registration can be achieved for all standards being supported.

In conventional cellular networks, each mobile station is assigned a unique Mobile Identification Number (MIN) or International Mobile Subscriber Identification number (IMSI) that uniquely identifies the mobile station. The MIN and IMSI can be used for billing, record keeping, and other purposes.

For a number of reasons (e.g., security), it is not desirable to transmit the real identity (e.g., the IMSI) of the mobile station over the air. Instead, the mobile station is typically assigned a Temporary Mobile Subscriber Identity (TMSI) by a network entity like the MSC that is used as an alias for the real identity of the mobile station. In W-CDMA and GSM MC-MAP systems, another level of security is provided over the air interface by a new mobile station identity. This identity is called R-TMSI in GSM MC-MAP and has a counterpart called RNTI in W-CDMA. The association between this identity and the upper network identity (e.g., TMSI in MSC) is maintained by the RNC/BSC. The R-TMSI is similar to the TMSI, but is known only by the base station and not by the MSC associated with the base station.

The temporary identity is a unique, typically randomly assigned, identification number of a particular length (e.g., 32 bits). A particular temporary identity number is typically assigned to only one user at any given time in a given registration zone by the assigning entity. The assigned temporary identity is typically only valid for communication with the base station(s) located in the area covered the assigning entity (e.g., R_TMSI is valid in the cells of the assigning base station for the GSM MC-MAP system, while TMSI is valid in the region covered by the MSC for all systems). The temporary identity is typically not valid when the mobile station crosses into a new registration area served by a different entity or after a particular period of time following the initial assignment of the temporary identity.

In addition to the registration performed with the network entities like MSC, in the GSM MC-MAP system, an additional (radio resource) RR-registration may be performed sometimes at the base station level, and the RR-registration zone is defined to be the coverage area of the base station. The RR-registration has two fold purposes: (1) to maintain a valid radio identity R-TMSI when the mobile station moves across the boundaries of various base stations while in a connected state, and (2) to minimize paging and enable fast transition to a dedicated state, when the mobile station has an active packet call, but no dedicated resources assigned due to inactivity. Since the RR-registration zone for the GSM MC-MAP system is quite small in size, RR-registration is typically performed more often because of the higher likelihood of moving between smaller sized zones.

In the technique described herein, the words registration and RR-registration will be used interchangeably. This technique can be used for any kind of registration where zones are small enough and "ping-pong" effect is a severe problem. At the same time, this technique focuses on a particular case, when the registration is with the BSC over the coverage area of a base station system. Hence it is termed RR-registration to distinctly classify it from registration with a network identity like the MSC.

As noted above, a large percentage of the mobile stations may be in the boundary areas of the cells in a wireless communication system. Depending on various factors such as, for example, movement of the mobile station and/or changes in the link conditions, a new base station may be deemed to be better received by a mobile station. If the mobile station is required to register with a base station each time it enters the associated coverage area, then the mobile station may continually (e.g., alternately) register with two or more base stations when it is in the boundary areas of these cells. This could severely affect system performance. Techniques to reduce (or eliminate) this ping-pong effect are highly desirable.

In accordance with an embodiment of the invention, a combination of a zone-based and timer-based registration schemes is used to reduce the amount of registration required by the mobile stations. The registration scheme is especially advantageous for situations in which the registration zone (in this case, the coverage area of a base station) is defined to be a (relatively) small area. In accordance with this registration scheme, a mobile station registers with a base station each time it enters a new registration area (e.g., a new R-TMSI zone, which corresponds to the coverage area of the base station). The mobile station also maintains a timer for each R-TMSI zone with which it has already registered but has since left. If the mobile station leaves a particular R-TMSI zone for a time period longer than a particular time-out period, the registration with that R-TMSI zone times out, and the mobile station then re-registers with that zone if and when it re-enters the zone.

Figure 2:
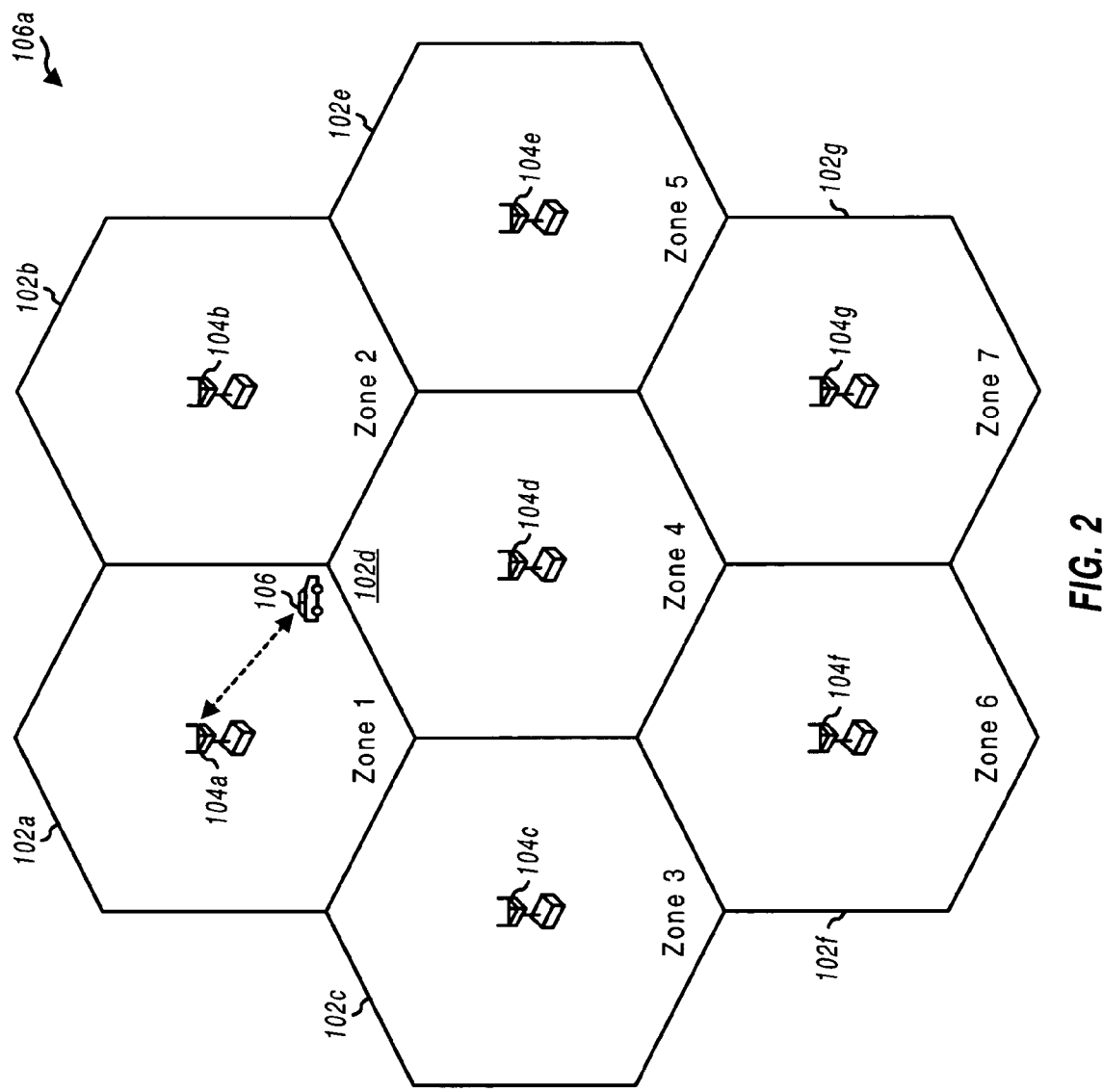
FIG. 2 is a diagram of a portion of the radio network in FIG. 1 and the registration for a mobile station located in the boundary area of a number of cells.

FIG. 2 is a diagram of a portion of radio network 100 and the registration for a mobile station 106 located in the boundary area of a number of cells 102. Initially, mobile station 106 is in the coverage area of base station 104a (e.g., R-TMSI zone 1) and registers with this base station, as indicated by the dashed line. Thereafter, mobile station 106 may move into the coverage area of base station 104b (e.g., R-TMSI zone 2) and also registers with this base station. Mobile station 106 may further move into the coverage area of base station 104d (e.g., R-TMSI zone 4), or some other base station, and may register with the base station serving this coverage area. Mobile station 106 may thereafter return to one of the zones it has previously registered. The registration scheme of the invention reduces the amount of registration required by mobile station 106 as it moves about radio network 100, as described in further detail below.

Figure 3:
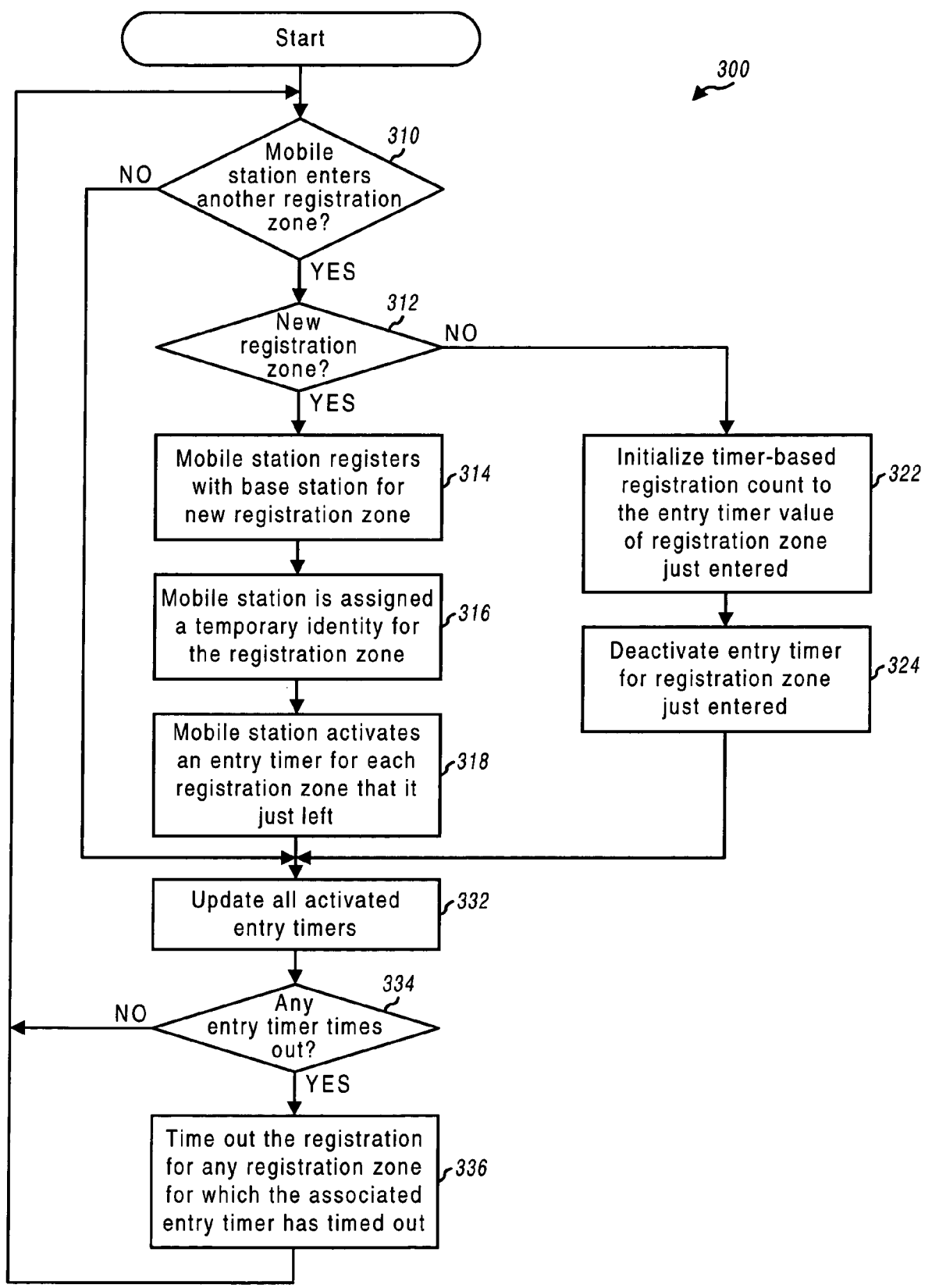
FIG. 3 is a flow diagram of a registration process in accordance with an embodiment of the invention.

FIG. 3 is a flow diagram of a registration process 300 in accordance with an embodiment of the invention. Registration process 300 includes a combination of a zone-based registration scheme and a timer-based registration scheme to reduce the amount of registration by a mobile station that may be located in the boundary area of a number of cells. Under the zone-based registration scheme, the mobile station registers with a base station when it moves into a registration zone in which it is not currently registered. Under the timer-based registration scheme, the mobile station re-registers with a base station if it has left the registration zone for a time period that exceeds a particular time-out period.

As shown in FIG. 3, a determination is initially made whether the mobile station has waken up in a particular registration zone or has entered into another registration zone, at step 310. The registration zone can be an R-TMSI zone defined by the GSM MC-MAP system. The determination of whether the mobile station has entered into another registration zone can be achieved, for example, by processing the broadcast messages transmitted by the base station serving the registration zone. If the mobile station has not entered into another registration zone, it proceeds to step 332.

Otherwise, a determination is made whether the mobile station has entered into a new registration zone, at step 312. A new registration zone is one with which the mobile station is not currently registered. If the registration zone is new, the mobile station registers with the base station responsible for the new registration zone, at step 314. As part of the registration, the mobile station is assigned temporary identity (e.g., an R-TMSI) to be used for subsequent communication with the base station, at step 316. The assigned temporary identity is stored by the mobile station in its internal storage for possible use at a later time. The mobile station then activates and resets an entry timer for each registration zone that it has just left, at step 318. The mobile station then proceeds to step 332.

Back at step 312, if the mobile station has re-entered a registration zone that it has already, and is still currently, registered (instead of a new registration zone), the mobile station initializes the timer-based registration count to the entry timer value for the registration zone it just entered, at step 322. This action results in the mobile station attempting to re-register with the base station of the current active zone prior to the registration expiration time. The mobile station then deactivates the entry timer for the registration zone it just entered, at step 324.

At step 332, the mobile station updates all entry timers (if any) that have been activated. This updating may entail incrementing the activated timers to account for the elapsed time since the last update. A determination is then made whether any of the activated entry timers have timed out, at step 334. A timer times out when it is incremented to a value equal to or greater than a time-out value. If no entry timers have timed out, the mobile station returns to step 310. Otherwise, the mobile station times out the registration for the registration zone for which the associated entry timer has timed out, at step 336. For a timed-out registration, the temporary identity for the registration zone may be deleted from the mobile station's internal storage, and the mobile station needs to re-register with that registration zone if and when it moves back into the zone. The mobile station then returns to step 310.

For clarity, the registration process shown in FIG. 3 can now be described for a specific example using the diagram shown in FIG. 2. In this example, the mobile station is initially located in R-TMSI zone 1 and registers with base station 104a. In the registration with base station 104a, the mobile station is assigned an R-TMSI 1 to be used for subsequent communication with base station 104a.

Thereafter, the mobile station moves into R-TMSI zone 2 and registers with base station 104b. In the registration with base station 104b, the mobile station is assigned an R-TMSI 2 to be used for subsequent communication with base station 104b. The mobile station may also receive from base station 104b a time-out value for R-TMSI 1 assigned by base station 104a, or may utilize a predetermined time-out value or some other time-out value for R-TMSI 1. The mobile station then activates and resets timer 1 to zero. The mobile station thereafter updates and compares timer 1 with the received or predetermined time-out value for R-TMSI zone 1.

Subsequently, if the mobile station returns to R-TMSI zone 1, the mobile station deactivates timer 1 it has previously activated for R-TMSI zone 1. The mobile station then activates a timer 2 for R-TMSI zone 2, the zone from which it has just left.

Alternatively, if the mobile station moves from R-TMSI zone 1 to R-TMSI zone 4, it registers with base station 104d. In the registration with base station 104d, the mobile station is assigned an R-TMSI 4 to be used in subsequent communication with base station 104d. The mobile station may also receive from base station 104d time-out values for only the last R-TMSI zone, in this case R-TMSI codes 1 assigned by base station 104a, or may utilize predetermined timer-out values for these zone. The mobile station then activates timer 1 for R-TMSI zone 1 and keeps on monitoring timer 2 for zone 2, its value unchanged when the mobile station moves from zone 1 to zone 4.

In this manner, upon entering each R-TMSI zone, the mobile station deactivates the timer associated with that zone. The mobile station also activates the timer for any R-TMSI zone that it has just left. The timers for other R-TMSI zones (if any) are not affected. The timers are incremented over time. Whenever a timer reaches the associated time-out value, indicating that the mobile station has not been in the associated zone within the time-out period, the registration with that zone times out. Thereafter, the mobile station needs to re-register with that R-TMSI zone if and when it moves back into the zone.

With the zone-based and timer-based registration schemes described above, the mobile station can be located at the boundary area of a number of cells and may need to register with the base station of each R-TMSI zone only once, even if the mobile station subsequently moved from one R-TMSI zone to another. If the mobile station registers with a particular R-TMSI zone and subsequently moves back into the zone within the time-out period, it needs not re-register with the base station for that zone. In this way, the registration ping-pong effects can be greatly reduced.

In accordance with an embodiment of the invention, the time-out value to be used for the R-TMSI zone that the mobile station has just left to enter into the new R-TMSI zone may be provided by the base station for the new R-TMSI zone. The frequency with which the registrations zones might change depends on the size and topology of the cells, shadowing effects, and how the network designer lays out the neighboring zones. Based on these conditions, the above feature gives a base station flexibility to choose a time-out value depending on the signal condition within the cell as compared to the signal condition from the cell the mobile station is moving from.

RR registration can be achieved via an exchange of messages between a mobile station and a base station serving the R-TMSI zone. Various message formats can be used. Table 1 lists a specific embodiment of a message format for an RR-Level Registration Message generated by the mobile station and sent to the base station. In this embodiment, the RR-Level Registration Message includes four fields having the identities and sizes shown in Table 1. Other message formats and fields can also be used and are within the scope of the invention.

TABLE 1

| Field | Length (bits) |
| --- | --- |
| RR_REG_TYPE | 4 |
| SLOT_CYCLE_INDEX | 3 |
| MOB_P_REV | 8 |
| KEY_SEQ_NEW | 0 or 4 |

The RR_REG_TYPE field indicates the particular type of event that causes the current RR registration attempt to occur. In an embodiment, this field is set to "0000" for a timer-based registration event, "0001" for a zone-based registration event, "0010" for a page response, and "0011" for a request for a traffic channel. The SLOT_CYCLE_INDEX field indicates the paging mode of the mobile station. This field can be set to the preferred slot cycle index, SLOT_CYCLE_INDEXp, if the mobile station is configured for slotted mode operation. Otherwise, this field is set to "000".

The MOB_P_REV field indicates the protocol revision of the mobile station.

The KEY_SEQ_NEW field includes a key sequence number corresponding to a new encryption key generated by the mobile station. This field is set to KEY_SEQ_NEW$_{S\text{-}P}$ which is the sequence number associated with the new encryption key generated by the mobile station.

Table 2 lists a specific embodiment of a message format for an R-TMSI Assignment Message sent may by a base station to a mobile station for RR registration. The R-TMSI Assignment Message may be sent by the base station in response to the RR-Level Registration Message sent by the mobile station, or in response to some other event. In this embodiment, the R-TMSI Assignment Message includes eight fields having the identities and sizes shown in Table 2. Again, other message formats and fields can also be used and are within the scope of the invention.

TABLE 2

| Field | Length (bits) |
| --- | --- |
| R_TMSI_INCL | 1 |
| R_TMSI_ZONE_LEN | 4 |
| R_TMSI_ZONE | 8 × R_TMSI_ZONE_LEN |
| R_TMSI_CODE | 32 |
| R_TMSI_EXP_PRD | 7 |
| ZONE_INFO_INCL | 1 |
| TOT_R_TMSI_ZONES | 3 |
| R_PREV_ZONE_PRD | 7 |

The R_TMSI_INCL field is a one-bit flag that indicates whether or not R-TMSI information is included in the R-TMSI Assignment Message. This field is set to "1" if the base station is assigning a new R-TMSI to the mobile station, and "0" otherwise. If the R_TMSI_INCL field is set to "1", the remaining fields in the message include valid data.

The R_TMSI_ZONE_LEN field defines the length of the subsequent R_TMSI_ZONE field in the R-TMSI Assignment Message. Specifically, this field is set to the number of octets (e.g., ranging from 1 to 8, inclusive) to be included in the R_TMSI_ZONE field.

The R_TMSI_ZONE field includes the R-TMSI zone number and has a length ranging between one to eight octets, as defined by the R_TMSI_ZONE_LEN field.

The R_TMSI_CODE field includes the 32-bit R-TMSI code assigned to the mobile station. All bits in this field are set to "1" to de-assign the R-TMSI.

The R_TMSI_EXP_PRD field defines the R-TMSI time-out period for the timer-based registration. The time-out period is also referred to as the expiration period. If the mobile station is not to perform timer-based RR registration, this field is set to "0000000". Otherwise, if the mobile station is to perform timer-based RR registration, this field is set to a value within a range of 28 to 85, inclusive. This range corresponds to 6 seconds to 55 hours if an 80 msec clock is used to update the timer. In an embodiment, the timer is set to $2^{R\_TMSI\_EXP\_PRD/4}$ and the time-out period is $2^{R\_TMSI\_EXP\_PRD/4} \cdot 0.08$ seconds.

The ZONE_INFO_INCL field is a one-bit flag that indicates whether or not the information for the maintenance of a zone list is included in the R-TMSI Assignment Message. This field is set to "1" if the mobile station is registering in a new zone and the R-TMSI Assignment Message includes valid information in the subsequent TOT_R_TMSI_ZONES and R_PREV_ZONE_PRD fields. Otherwise, this field is set to "0".

The TOT_R_TMSI_ZONES field indicates the maximum number of R-TMSI zones to be maintained by the mobile station for purposes of zone-based RR registration. If zone-based RR registration is to be disabled, this field is set to "000".

The R_PREV_ZONE_PRD field defines the R-TMSI time-out period to be used for the previous R-TMSI zone from which the mobile station has just left. This time-out period is also referred to as the previous zone expiration period. This field is set to a value within a range of 24 to 85, inclusive. This range corresponds to 375 msecs to 55 hours if an 80 msec clock is used to update the timer. The previous zone expiration period is thus $2^{R\_PREV\_ZONE\_PRD/4} \cdot 0.08$ seconds.

Table 3 shows an embodiment of an entry in a zone list maintained by a mobile station for RR-level registration. The zone list can include a number of entries, up to the number specified by TOT_R_TMSI_ZONES defined above. In this embodiment, each entry in the zone list includes five fields having the identities and sizes shown in Table 3. Entries with other formats and fields can also be used and are within the scope of the invention.

TABLE 3

| Field | Length (bits) |
| --- | --- |
| R_TMSI_ZONE | 8–64 |
| R_TMSI_CODE | 32 |
| R_TMSI_COUNT | |
| R_TMSI_COUNT_MAX | |
| Entry Timer | |

The R_TMSI_ZONE field includes the R-TMSI zone number for the entry. The R_TMSI_CODE field includes the 32-bit R-TMSI code assigned to the mobile station for that R-TMSI zone. The R_TMSI_COUNT field includes a count (corresponding to the time-out period) maintained by the mobile station for that R-TMSI zone for timer-based RR registration. The R_TMSI_COUNT_MAX field includes a maximum value for R_TMSI_COUNT. The Entry Timer field includes a timer used to time-out registration with the R-TMSI zone. Additional fields may also be included for other parameters such as, for example, the mode to be used to receive pages from the associated base station (e.g., slotted mode or some other mode).

The entries in the zone list include information for the active R-TMSI zones and can be arranged in various orders. For example, the entries can be arranged based on the time of registration with the R-TMSI zones (i.e., the age of the zones).

Figure 4:
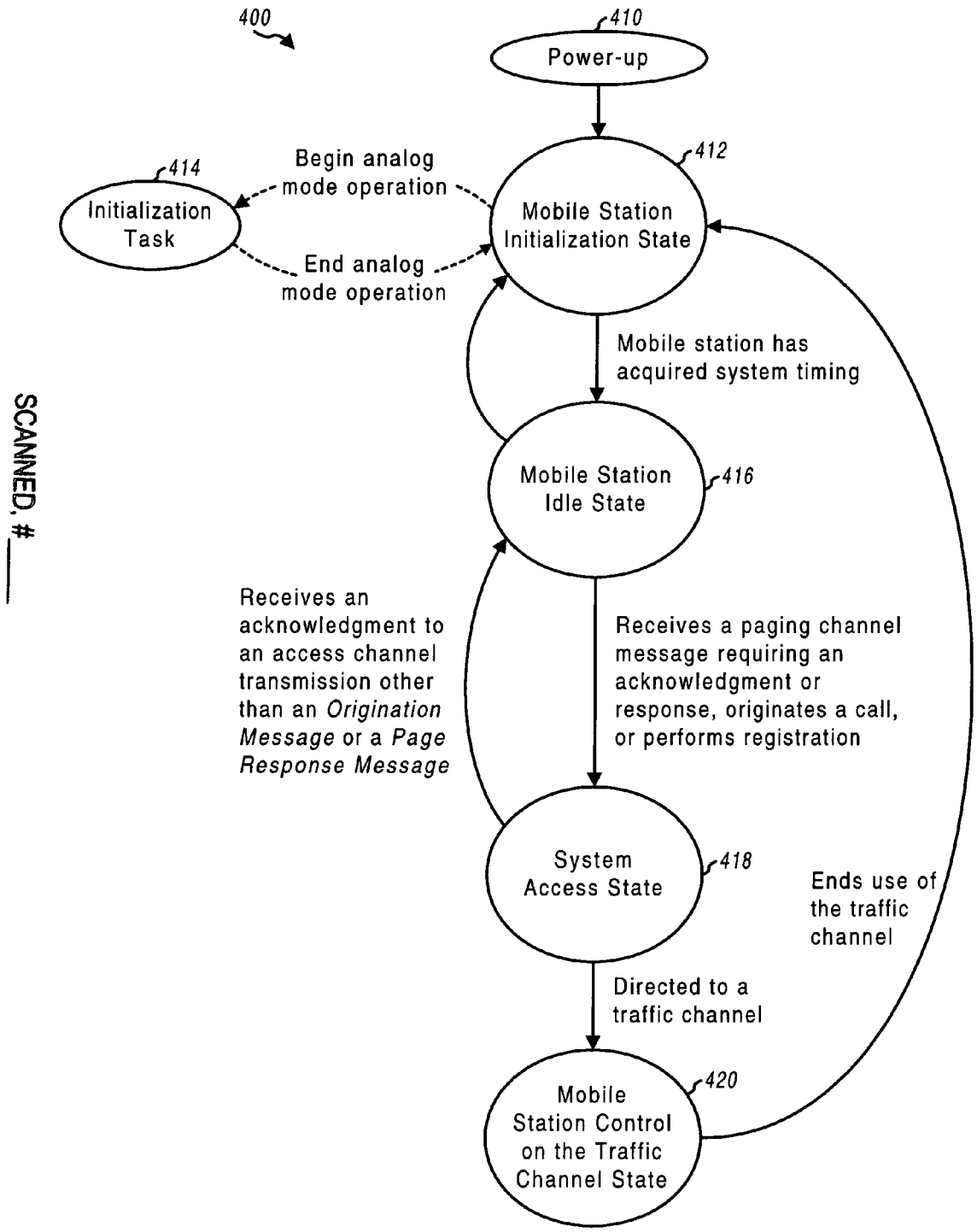
FIG. 4 is a diagram of a state machine for an embodiment of mobile station call processing.

FIG. 4 is a diagram of a state machine 400 for an embodiment of mobile station call processing. This state machine is similar to the one defined by, and described in further detail in, the cdma2000 standard. State machine 400 includes a power-up state 410, a mobile station initialization state 412, an initialization task state 414, a mobile station idle state 416, a system access state 418, and a mobile station control on the traffic channel state 420. Each of the states may further include a number of substates. Upon power-up, the mobile station transitions from power-up state 410 to mobile station initialization state 412.

In initialization state 412, the mobile station selects a particular system to use. If the selected system is an analog system, the mobile station transitions to initialization task state 414 and begins analog mode operation. Otherwise, if the selected system is a CDMA system, the mobile station proceeds to acquire and synchronize to the selected CDMA system (or more specifically, to one or more base stations in the selected system). Once the mobile station has acquired the timing of the selected CDMA system, it enters mobile station idle state 416.

In mobile station idle state 416, the mobile station is "on" but not active. The mobile station monitors a paging channel on the forward link for messages from the base station. If the mobile station is unable to receive the paging channel or if another base station is to be added to the active set, the mobile station returns to state 412 and acquires another base station. In state 416, the mobile station can receive messages or an incoming call, originate a call, perform registration, initiate a message transmission, or perform some other actions. Upon initiating any of these actions, the mobile station transitions to system access state 418.

In system access state 418, the mobile station sends messages to the base station on one or more access channels and receives messages from the base station on a paging channel in an attempt to access the base station. The exchange of messages is dependent on the particular type of communication (e.g., voice, data) between the mobile station and the base station and the originator of the message (i.e., the mobile station or base station), and is described in further detail in the cdma2000 standard. Depending on the outcome of the message exchange, the mobile station may return to mobile station idle state 416 if no "active" communication is to be performed with the base station or proceed to mobile station control on the traffic channel state 420 if a call with the base station is to be processed. Prior to the transition to state 420, the mobile station is assigned a forward traffic channel for the call.

In mobile station control on the traffic channel state 420, the mobile station communicates with the base station using the established forward and reverse traffic channels. Upon termination of the call, the mobile station returns to state 412.

Figure 5:
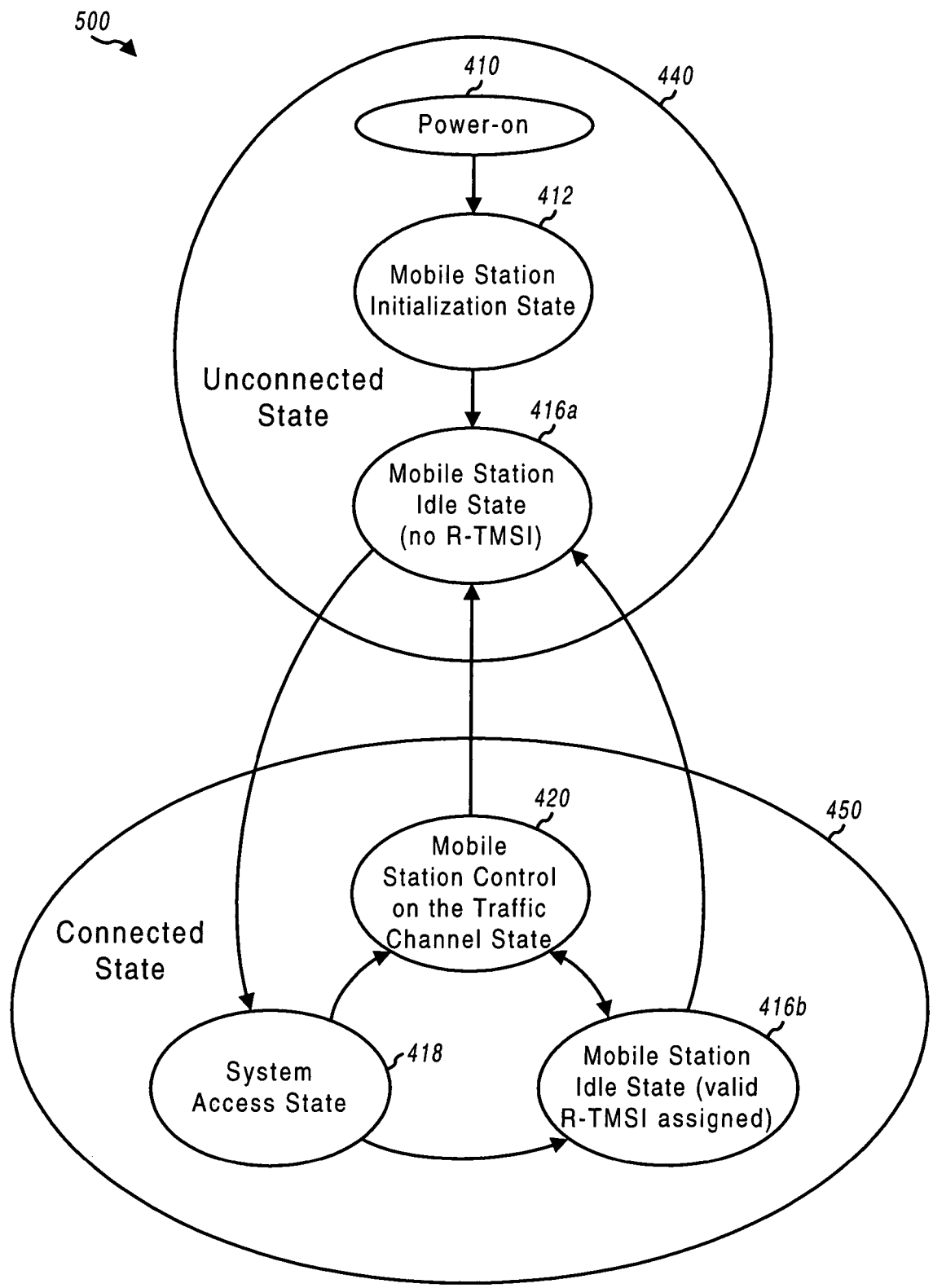
FIG. 5 is another diagram of the state machine in FIG. 4 used to describe an RR registration process.

FIG. 5 is a diagram of a state machine 500, which can be used in accordance with one embodiment to describe the RR registration process, when RR-registration is supported in addition to upper network registration (for e.g., with the MSC). Depending on whether or not the mobile station is registered at the RR-level (i.e., at the BSC level), the states in FIG. 4 can be grouped into an unconnected state 440 and a connected state 450. Unconnected state 440 includes power-up state 410, mobile station initialization state 412, and the mobile station idle state 416a when R-TMSI is not assigned. Connected state 450 includes system access state 418, mobile station control on the traffic channel state 420, and mobile station idle state 416b when a valid R-TMSI is assigned and the mobile station is known to the base station (at RR-level). Unconnected state 440 represents an idle state that the mobile station enters upon power-up and in which the mobile station is not registered with any R-TMSI zone. Connected state 450 represents a state in which RRC connection has been established and RR registration is allowed.

In an embodiment, system access state 418 is entered from unconnected state 440 upon establishment of an RR connection. An R-TMSI is assigned to the mobile station during the RR connection establishment. Thereafter, the mobile station transitions from system access state 418 to either mobile station control on the traffic channel state 420 to communicate with the base station or to mobile station idle state 416b.

In mobile station idle state 416b, the mobile station has been assigned R-TMSI and can thereafter transition to state 420 to communicate with the base station. From states 416b and 420, the mobile station can transition back to unconnected state 440 when it is no longer registered with the base station (e.g., when the timer associated with the R-TMSI zone times out). The transition between the states in FIG. 5 can be achieved via messages (e.g., R-TMSI Assignment Message), which are described in further detail below.

A specific implementation of the RR registration procedures is now described for a cdma2000 system that also supports the GSM MC-MAP standard. In this implementation, a number of configuration parameters are defined to facilitate the RR registration. Table 4 lists some of the configuration parameters and their definition. These parameters are stored at the mobile station. In Table 4, the subscript "S" stands for semi-memory, the contents of which are lost as soon as the mobile station powers down.

TABLE 4

| Parameter | Definition |
|---|---|
| ASSIGNING_R_TMSI_ZONE$_S$ | The assigning R-TMSI zone (i.e., the R-TMSI zone with which the mobile station most recently registered. This is the R-TMSI zone broadcasted by the current base station. Mobile station use this value to find out if it is currently registered in the same zone or not.) |
| RR_REG_COUNT$_S$ | The count maintained by the mobile station for timer-based registration, and used to determine the timer expiration period for timer-based registration. |
| RR_REG_COUNT_MAX$_S$ | The maximum allowable value for RR_REG_COUNT$_S$. |
| RR_REG_INC$_S$ | The incrementing counter used for RR-level registration (e.g., incremented every 80 msec). |
| RR_REG_ENABLED$_S$ | A one-bit flag that indicates whether the mobile station can perform RR-level registration. This flag is set to "1" to enable RR registration and also set to "1" if the mobile station has a valid R-TMSI assigned, which is equivalent to having RR registration and have it enabled. |
| R_TMSI_CODE$_S$ | The R-TMSI code corresponding to the zone with which the mobile station most recently registered. |
| R_ZONE_LIST$_S$ | The list of R-TMSIs the mobile station has been assigned for the zones with which it has registered. Each entry in the R_ZONE_LIST$_S$ can be as defined in Table 3. |
| TIMER_REG$_S$ | A flag that indicates whether timer-based registration is enabled or not. This flag is set to "1" if the timer-based registration is enabled. This counter is used because in Traffic Channel state no timer-based registration is performed, and the mobile station can use this register to shut off registration when it goes to the Traffic State. |
| TOT_R_TMSI_ZONES$_S$ | The maximum allowable number of entries in the R_ZONE_LIST$_S$. |

In this specific implementation, the system supports a number of RR-level registration methods including:

Timer-based RR registration—the mobile station registers when a timer expires.
   Zone-based RR registration—the mobile station registers when it enters a new zone.
   Implicit RR registration—the mobile station implicitly registers when it successfully sends an RRC Connection Request Message to a base station, and the base station can infer the location of the mobile station from the message.

Traffic Channel RR registration—whenever a base station has registration information for a mobile station that has been assigned to a traffic channel, the base station can notify the mobile station that it is registered.

Some of these registration methods are described in further detail below.

Timer-Based RR Registration

With timer-based RR registration, the mobile station registers at the RR level at regular intervals. The TIMER_REG$_S$ flag indicates whether timer-based registration is enabled. In an embodiment, a base station can disable timer-based registration by setting to zero the R_TMSI_EXP_PRD field of the R-TMSI Assignment Message. The mobile station computes and stores the timer expiration count as $RR\_REG\_COUNT\_MAX_S = 2^{R\_TMSI\_EXP\_PRD/4}$. The mobile station maintains an RR registration counter, RR_REG_COUNT$_S$ that receives a (pseudo random) value between a range of 0 and RR_REG_COUNT_MAX$_S$−1.

Timer-based RR registration uses a counter, RR_REG_INC$_S$, which is incremented at a particular update rate. The update rate corresponds to a particular time increment (e.g., 80 msec) and can be provided by a timer such as a Paging Channel or a Forward Common Control Channel slot counter. If TIMER_REG$_S$ is equal to "yes" and all bits of R_TMSI_CODE$_S$ are not equal to "1" (indicating that registration is enabled and the mobile station has established RRC connection, respectively), timer-based RR registration is performed when the counter RR_REG_INC$_S$ reaches a value greater than RR_REG_COUNT$_S$. The value stored in RR_REG_COUNT$_S$ may be controlled by a base station via the R_TMSI_EXP_PRD field of the R-TMSI Assignment Message. The counter RR_REG_INC$_S$ is reset each time the mobile station receives an R-TMSI Assignment Message or the timer-based RR registration enable flag TIMER_REG$_S$ is changed from "no" to "yes".

In an embodiment, whenever the mobile station changes TIMER_REG$_S$ from "no" to "yes", it sets RR_REG_COUNT$_S$ to a pseudo random value ranging between 0 and RR_REG_COUNT_MAX$_S$−1 and is generated using a pseudo random number generator. Both the base station and mobile station will be using a timer. The base station expects that the mobile station will come back to it within RR_REG_COUNT_MAX time with a RR registration message. If the mobile station delays, the base station will de-register it and the mobile station will no longer be identified unless it goes through another authentication process. So the mobile station chooses a value less than RR_REG_COUNT_MAX. A pseudo-random value is selected because it leaves the parameter open for various different implementations. Any value less than RR_REG_COUNT_MAX may also be used and are within the scope of the invention. The mobile station also increments the counter, RR_REG_INC$_S$, each time it receives an update signal (e.g., each 80 msec interval).

Zone-Based RR Registration

With zone-based RR registration, a mobile station registers at the RR level whenever it moves into a new R-TMSI zone that is not already stored on its internally stored list of visited zones. Each R-TMSI zone within a given network corresponds to an RR registration zone. A zone is added to the list whenever an RR registration (including implicit RR registration) is performed, and is deleted upon the expiration of a timer maintained for the zone.

A mobile station can be registered in more than one R-TMSI zone. The mobile station maintains a list, R_ZONE_LIST$_S$, of the zones in which it has registered. In an embodiment, each entry in the R_ZONE_LIST$_S$ includes the R_TMSI_ZONE, R_TMSI_CODE, R_TMSI_COUNT, R_TMSI_COUNT_MAX, and the entry timer, as shown in Table 3. The mobile station provides a means to allow each timer's value to be examined while the timer is active so that the age of the entries in the list can be ascertained. The entry timer for each zone is reset each time R_TMSI_COUNT is reassigned. R_TMSI count will be reassigned each time the mobile station receives an acknowledgement via R-TMSI Assignment Message.

In an embodiment, the maximum number of zones in which the mobile station may be considered registered may be controlled by the most recent base station with which the mobile station has registered. This control may be achieved via the TOT_R_TMSI_ZONES field in the R-TMSI Assignment Message whenever a new R-TMSI is assigned as a result of registering in a new R-TMSI zone. Whenever an entry is added to the R_ZONE_LIST$_S$ or if TOT_R_TMSI_ZONE$_S$ is decreased, the mobile station removes excessive entries from the list if there are more entries than allowed by the setting of TOT_R_TMSI_ZONES$_S$. Whenever R_ZONE_LIST$_S$ includes more than TOT_R_TMSI_ZONES$_S$ entries, the mobile station deletes the excess entries in accordance with the following rules:

If TOT_R_TMSI_ZONES$_S$ is equal to zero, the mobile station deletes all entries in the list.

If TOT_R_TMSI_ZONES$_S$ is not equal to zero, the mobile station deletes entries having activated entry timers, starting with the oldest entry, as determined by the entry timer values, and continuing in order of decreasing age until no more than TOT_R_TMSI_ZONES$_S$ entries remain.

RRC Connection Mobility Procedures

When a mobile station that supports MC-MAP successfully sends an RRC Connection Request Message in mobile station idle state 416a of unconnected state 440 in FIG. 5, the base station can infer the location of the mobile station and an implicit RR-level registration may be performed. In response, the base station may notify the mobile station that it is registered at the RR level by sending an R-TMSI Assignment Message with a valid R-TMSI. The mobile station thereafter transitions to connected state 450.

While the RRC connection is established (e.g., for a call, or for other reasons for information exchange with the network) and the MC-MAP mobile station is in a traffic channel substate of mobile station control on the traffic channel state 420, it may implicitly performs traffic channel RR-level registration. Again, in response, the base station may notify the mobile station that it is registered with at RR level by sending an R-TMSI Assignment Message. The base station may also assign the mobile station a new R-TMSI.

If the call is timed out while in mobile station control on the traffic channel state 420, the base station may direct the MC-MAP mobile station to common channels by sending a Release Order. RRC connection on the common channels is achieved by maintaining RR-level registration of the mobile station and a valid R-TMSI. While monitoring the common channels, the MC-MAP mobile station can perform periodic zone-based or ordered RR-level registration by sending an RR-Level Registration Message.

A base station that receives the RR-Level Registration Message may accept the registration and allocate the mobile station a new R-TMSI by sending an R-TMSI Assignment Message. If the base station sends the mobile station an R-TMSI Assignment Message with all bits of R_TMSI_CODE set to "1", the mobile station sets all bits of R_TMSI_CODE$_S$ to "1" and RR_REG_ENABLED$_S$ to "no". On sending this R-TMSI Assignment Message with all bits of R_TMSI_CODE set to "1", the connection of the mobile station is closed on radio resource (RR) layer until an RRC connection is established.

If the mobile station performs a periodic RR-level registration in the same R-TMSI zone as the one with which it has already registered, the base station may or may not assign it a new R-TMSI. If the mobile station registers at the RR level in a new R-TMSI zone, the base station may, via the R-TMSI Assignment Message, either assign it a new R-TMSI or reject the RR registration.

The RR-level registration is now described for the state machine shown in FIG. 5. In an embodiment, if the mobile station enters a system determination substate of mobile station initialization state 412 with a power-up indication, the mobile station performs a number of actions, which may include the following:

- The mobile station deletes all entries in the R_ZONE_LIST$_S$ to initialize the list since no registration has yet been performed for any zone.
- The mobile station sets all bits of the R_TMSI_CODE$_S$ to "1", which indicates that the RRC connection has not been established. In the definition of R-TMSI, an R_TMSI_CODE with all bits set equal "1" means that it is not valid R-TMSI and is equivalent to R-TMSI not assigned.
- The mobile station sets the RR registration enable flag, RR_REG_ENABLED$_S$, to "no" to disable RR registration. This action disables RR registration at least until an RRC connection has been established.
- The mobile station further sets the timer-based RR registration enable flag, TIMER_REG$_S$, to "no" to disable timer-based registration. Again, this action disables timer-based registration until an RRC connection has been established.

The mobile station performs a number of actions in system access state 418, which may include the following:

- If an MC-MAP mobile station successfully sends an MC-MAP RRC Connection Request Message or RR-Level Registration Message, it sets RR_REG_ENABLED$_S$ to "yes" to enable RR-level registration. The bits of the R_TMSI_CODE$_S$ are all still set to "1", until the base station assigns it. The base station also typically maintains a similar implementation, but is not specified. If the mobile station does not receive an R-TMSI Assignment Message within a particular time period (e.g., T75m, as defined by the cdma2000 standard), it sets all bits of the R_TMSI_CODE$_S$ to "1" to indicate that the connection has not been established.
- If an R-TMSI Assignment Message is received within the particular time period (T75m), the mobile station processes the message as described below.
- If the mobile station declares an access attempt failure when in system access state 418, the mobile station sets RR_REG_ENABLED$_S$ to "no" to disable RR-level registration, sets all bits of R_TMSI_CODE$_S$ to "1" to indicate that the connection has not been established, and deletes all entries in R_ZONE_LIST$_S$ to re-initialize the list.

The mobile station performs RR registration while in mobile station idle state 416*a* only if RR_REG_ENABLED$_S$ is set to "1" (indicating that RR registration is enabled). The mobile station performs a number of actions for RR registration in this idle state, which may include the following:

- If RR_REG_ENABLED$_S$ is equal to "1" (indicating that RR registration is enabled) and RR_REG_COUNT_MAX$_S$ is greater than 1 (indicating that the allowable maximum time for receiving R-TMSI Assignment Message has expired), the mobile station sets TIMER_REG$_S$ to "1" to enable timer-based registration.
- In response to an overhead information operation (i.e., a continuous broadcast by the base station within its R-TMSI zone for all mobile stations to know if they are in the zone in which they are registered), the mobile station compares the R_TMSI_ZONE in the broadcasted zone by the base station: Overhead information operation with its stored ASSIGNING_R_TMSI_ZONE$_S$ to determine whether the zones are the same. If the zones are different but R_TMSI_ZONE is one of the entries of R_ZONE_LIST$_S$ (indicating that the mobile station has previously registered with this zone), the mobile station sets ASSIGNING_R_TMSI_ZONE$_S$, R_TMSI_CODE$_S$, RR_REG_COUNT_MAX$_S$, and RR_REG_COUNT$_S$ to the corresponding R_TMSI_ZONE, R_TMSI_CODE, R_TMSI_COUNT_MAX, and R_TMSI_COUNT values of the zone list entry for R_TMSI_ZONE. This action updates the configuration parameters (with the subscript S) to the values for the most recently registered zone.
- If the timer of any entry in R_ZONE_LIST$_S$ has expired, the mobile station deletes the entry with the expired timer from R_ZONE_LIST$_S$ if the R_TMSI_ZONE of this entry is not equal to the ASSIGNING_R_TMSI_ZONE$_S$. This action deletes from the zone list all R-TMSI zones in which the mobile station has not visited within the time-out period.
- The mobile station performs timer-based RR registration with the base station in the R-TMSI zone in which it is located (i.e., the broadcasted zone) if the following conditions are met:
  (1) RR_REG_ENABLED$_S$ is equal to "yes", indicating that RR-level registration is enabled;
  (2) TIMER_REG$_S$ is equal to "yes", indicating that timer-based registration is enabled;
  (3) the stored configuration parameters (e.g., the ones in Table 4) are current;
  (4) all bits of R_TMSI_CODE$_S$ are not all equal to "1", indicating that the RRC connection is not closed; and
  (5) RR_REG_INC$_S$ is greater than or equal to RR_REG_COUNT$_S$, indicating that the mobile station has not registered with this R-TMSI zone within a particular pseudo random period.
- The mobile station performs zone-based RR registration with the current zone in which it is located, irrespective of where it registered last time, if the following conditions are met:
  (1) TOT_R_TMSI_ZONES$_S$ is not equal to zero;
  (2) the stored configuration parameters are current;
  (3) RR_REG_ENABLED$_S$ is equal to "yes", indicating that RR-level registration is enabled; and
  (4) there is no entry of R_ZONE_LIST$_S$ whose R_TMSI_ZONE field is not equal to the stored ASSIGNING_R_TMSI_ZONE$_S$.

While in mobile station idle state 416, if any action necessitates RR registration, the mobile station enters an update overhead information substate of system access state 418 and performs RR registration.

While in mobile station control on the traffic channel state 420, the mobile station performs a number of actions, which may include the following:

- The mobile station maintains the entry timers for all entries in R_ZONE_LIST$_S$. If the timer of any entry in R_ZONE_LIST$_S$ expires, the mobile station removes the corresponding entry from the list. This action removes entries for R-TMSI zones that the mobile station has not visited within the time-out period.

If RR_REG_COUNT$_S$ is greater than or equal to the value of RR_REG_COUNT_MAX$_S$ (indicating that allowable maximum time for receiving R-TMSI Assignment Message has expired), the mobile station sets all bits of the R_TMSI_CODE$_S$ to "1". On traffic channels, the base station knows where the mobile station is and has the responsibility to send R-TMSI Assignment Message. Communication on traffic channels does not require R-TMSI, so the base station and mobile station are still communicating but the connection will be dropped as soon as traffic channels are lost.

The mobile station further performs additional actions while in various substates of mobile station control on the traffic channel state 420. These additional actions may include the following:

Upon entering a traffic channel initialization substate of state 420, the mobile station sets TIMER_REG$_S$ to "no" to disable timer-based registration. This action temporarily disables timer-based registration while the mobile station on traffic channels.

In traffic channel substate of state 420, the mobile station processes the R-TMSI Assignment Message upon reception.

In a release substate of state 420, the mobile station sets RR_REG_ENABLED$_S$ to "no" if all bits of R_TMSI_CODE$_S$ are set to "1". Otherwise, the mobile station set TIMER_REG$_S$ to "yes" to activate timer-based registration. These actions re-enable timer-based registration after completion of the call, unless the RRC connection has been closed.

The R-TMSI Assignment Message sent by the base station for RR-level registration can have the format shown in Table 2. Upon receiving the R-TMSI Assignment Message, the mobile station can store the values sent in various fields of the message (which are designated with the subscript R), as follows:

If R_TMSI_INCL in the message is equal to "1", indicating that the message includes valid R-TMSI information, the mobile station stores the R-TMSI zone, R-TMSI code, and expiration timer values as follows:

The mobile station stores the length of the R-TMSI zone field by setting ASSIGNING_R_TMSI_ZONE_LEN$_S$ equal to R_TMSI_ZONE_LEN$_R$.

The mobile station stores the assigning R-TMSI zone number by setting the ASSIGNING_R_TMSI_ZONE_LEN$_S$ least significant octets of ASSIGNING_R_TMSI_ZONE$_S$ to R_TMSI_ZONE$_R$.

The mobile station stores the R-TMSI code by setting R_TMSI_CODE$_S$ to R_TMSI_CODE$_R$.

The mobile station reads the value in the R_TMSI_EXP_PRD field of the message and sets the RR_REG_COUNT_MAX$_S$ and RR_REG_COUNT$_S$ based on this value, as described below.

If R_TMSI_INCL in the message is equal to "1", the mobile station stores the R-TMSI zone, R-TMSI code, and expiration timer as an entry in R_ZONE_LIST$_S$. If none exists for this R-TMSI zone, then some default and/or previous values may be used. The mobile station then starts the entry timer. The timer of new zone tells the time after which mobile station performs timer based registration for the active zone. The timer for the previous zone tells the expiration timer of the R-TMSI associated with that zone.

If R_TMSI_INCL in the message is equal to "1" and all bits of R_TMSI_CODE$_R$ are set to "1", the mobile station sets RR_REG_ENABLED$_S$ to "no" to disable RR registration. This type of message is sent by the base station when it wants to disable the RR-registration with the mobile station.

If ZONE_INFO_INCL in the message is equal to "1", indicating that the message includes additional information from the base station to regulate RR registration, the mobile station performs the following:

The mobile station stores the value in TOT_R_TMSI_ZONES$_R$ to TOT_R_TMSI_ZONES$_S$.

If R_ZONE_LIST$_S$ includes more entries than the updated TOT_R_TMSI_ZONES$_S$, the mobile station deletes excess entries according to the rules described above.

The mobile station reads the R_PREV_ZONE_PRD field in the message and sets the following fields of the entry in R_ZONE_LIST$_S$ corresponding to the last R-TMSI zone it has just left, as follows:

1) The mobile station computes and sets R_TMSI_COUNT_MAX as R_TMSI_COUNT_MAX$_S$= $2^{R\_PREV\_ZONE\_PRD/4}$.

2) The mobile station sets R_TMSI_COUNT$_S$ to a pseudo random value between 0 and R_TMSI_COUNT_MAX$_S$–1 (e.g., using a pseudo random number generator specified in the cdma2000 standard).

3) The mobile station resets the entry timer in R_ZONE_LIST$_S$ for the R-TMSI zone it has just left.

To provide a better understanding of the invention, the registration techniques of the invention have been described for a specific implementation for the cdma2000 system on the GSM MC-MAP standard. Various aspects of the invention described above can also be implemented in other (CDMA, TDMA, and FDMA) systems and standards, and this is within the scope of the invention.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for registering with a plurality of registration zones in a wireless communication network, the method comprising:

receiving an assignment for a first Temporary Mobile Station Identity (TMSI) from a first network entity in response to registration with a first registration zone;

registering with a second network entity in a second registration zone;

receiving an assignment for a second TMSI from the second network entity in response to registration with the second registration zone;

maintaining a first counter to provide an indication to initiate timer-based registration; initiating timer-based registration if a value in the first counter exceeds a timer-based registration count value;

receiving a value representative of a maximum expiration period for timer-based registration; and setting the timer-based registration count value based on the received value.

2. The method of claim 1, wherein each network entity corresponds to a base station in the communication network.

3. The method of claim 1, wherein the timer-based registration count value is a pseudo random value in a range between zero and a maximum value related to the received value.

4. The method of claim 1, wherein the registration with the second network entity is in response to entering the second registration zone.

5. The method of claim 1, wherein the registration with the second network entity is implicitly performed in response to establishing a connection with the second network entity.

6. The method of claim 1, wherein the first registration zone is entered first and the second registration zone is subsequently entered, the method further comprising:
activating a first timer for the first registration zone upon registration with the second network entity.

7. The method of claim 6, further comprising:
updating a count value for the first timer at each update interval; and
timing out registration with the first registration zone if a count value for the first timer exceeds a time-out value.

8. The method of claim 7, wherein the time-out value for the first timer for the first registration zone is provided by the second network entity.

9. The method of claim 1, further comprising:
deactivating a second timer for the second registration zone upon registration with the second network entity.

10. The method of claim 1, further comprising:
maintaining a zone list having a plurality of entries, one entry for each registration zone in which TMSI has been assigned and with which registration is currently valid.

11. The method of claim 10, further comprising:
receiving a value indicative of a maximum number of registration zones with which registration is allowed; and
deleting one or more entries from the zone list such that the number of entries maintained in the zone list is equal to or less than the maximum number of allowable registration zones.

12. The method of claim 11, wherein oldest entries in the zone list are deleted first.

13. The method of claim 12, wherein the oldest entries in the zone list are determined by associated timers activated for the entries.

14. The method of claim 10, wherein each entry in the zone list corresponds to an active registration zone, and wherein each entry includes
a zone number of the active registration zone,
a zone code assigned for the active registration zone, and
an entry timer for providing an indication used to time out registration with the active registration zone.

15. The method of claim 14, wherein each entry in the zone list further includes
a time-out count indicative of a maximum time-out period for registration with the active registration zone, and
wherein a time-out period for registration with the active registration zone is determined based in part on the time-out count.

16. The method of claim 1, wherein registration is enabled while in a connected state indicative of an established connection between a mobile station and a base station.

17. The method of claim 1, wherein radio resource (RR)-level registration is enabled via a message from a network entity.

18. The method of claim 1, wherein timer-based registration is enabled via a message from a network entity.

19. A method for registering with a plurality of Radio Temporary Mobile Station Identity (R-TMSI) zones in a wireless communication network, the method comprising:
registering with a first base station in a first R-TMSI zone;
receiving an assignment for a first R-TMSI code from the first base station in response to registration with the first R-TMSI zone;
registering with a second base station in a second R-TMSI zone;
receiving an assignment for a second R-TMSI code from the second base station in response to registration with the second R-TMSI zone;
activating a first timer for the first R-TMSI zone upon registration with the second base station; and
deactivating a second timer for the second R-TMSI zone upon registration with the second base station.

20. The method of claim 19, further comprising:
updating a count value for the first timer at each update interval; and
timing out registration with the first R-TMSI zone if the count value for the first timer exceeds a time-out value.

21. A method for managing multiple Temporary Mobile Station Identities (TMSIs) in a radio communication network, the method comprising:
assigning a first TMSI to a mobile station via a first base station when the mobile station enters a first Radio TMSI (R-TMSI) zone;
registering the mobile station with a second base station in a second R-TMSI zone;
assigning a second TMSI to the mobile station via the second base station so that the mobile station is registered in a plurality of R-TMSI zone,
activating a first timer for the first R-TMSI zone upon registration with the second base station; and
deactivating a second timer for the second R-TMSI zone upon registration with the second base station.

22. An apparatus for registering with a plurality of registration zones in a wireless communication network, comprising:
means for receiving an assignment for a first Temporary Mobile Station Identity (TMSI) from a first network entity in response to registration with a first registration zone;
means for registering with a second network entity in a second registration zone;
means for receiving an assignment for a second TMSI from the second network entity in response to registration with the second registration zone,
means for maintaining a first counter to provide an indication to initiate timer-based registration; and
means for initiating timer-based registration if a value in the first counter exceeds a timer-based registration count value;
means for receiving a value representative of a maximum expiration period for timer-based registration; and
means for setting the timer-based registration count value based on the received value.

23. The apparatus of claim 22, wherein each network entity corresponds to a base station in the communication network.

24. The apparatus of claim 22, wherein the timer-based registration count value is a pseudo random value in a range between zero and a maximum value related to the received value.

* * * * *